April 8, 1969 — W. B. BENNETT — 3,437,374
COMBINATION HEADREST AND LIFEVEST CONTAINER
Filed July 6, 1967 — Sheet 1 of 2
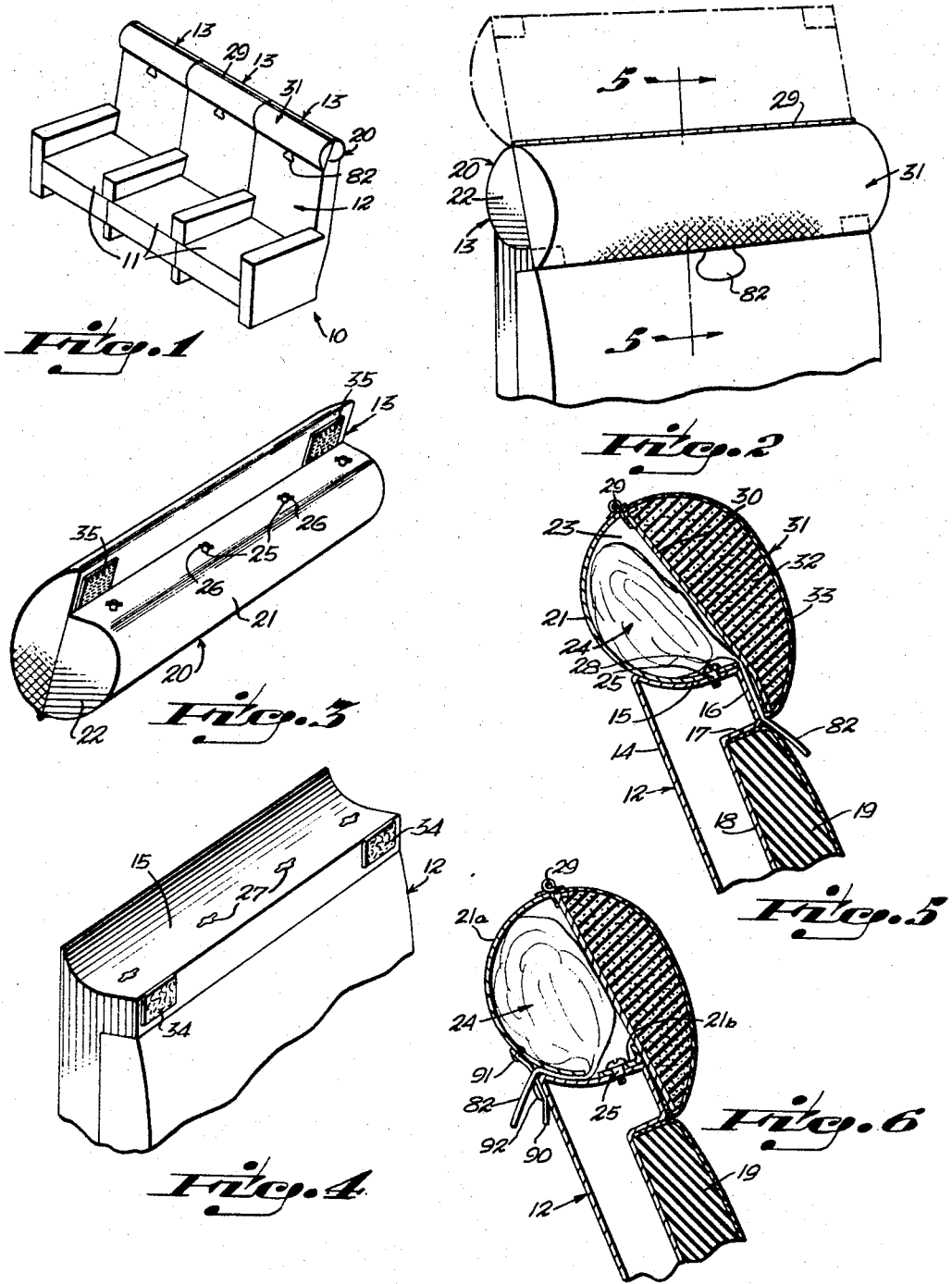
INVENTOR.
WILLIAM B. BENNETT
BY Ernest H. Schmidt
ATTORNEY.

April 8, 1969   W. B. BENNETT   3,437,374
COMBINATION HEADREST AND LIFEVEST CONTAINER
Filed July 6, 1967   Sheet 2 of 2
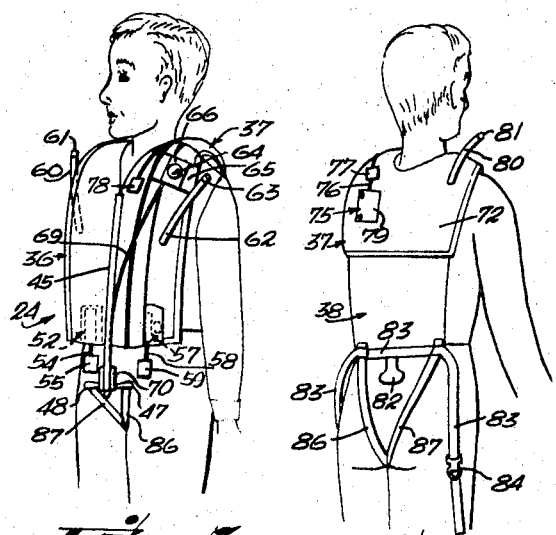
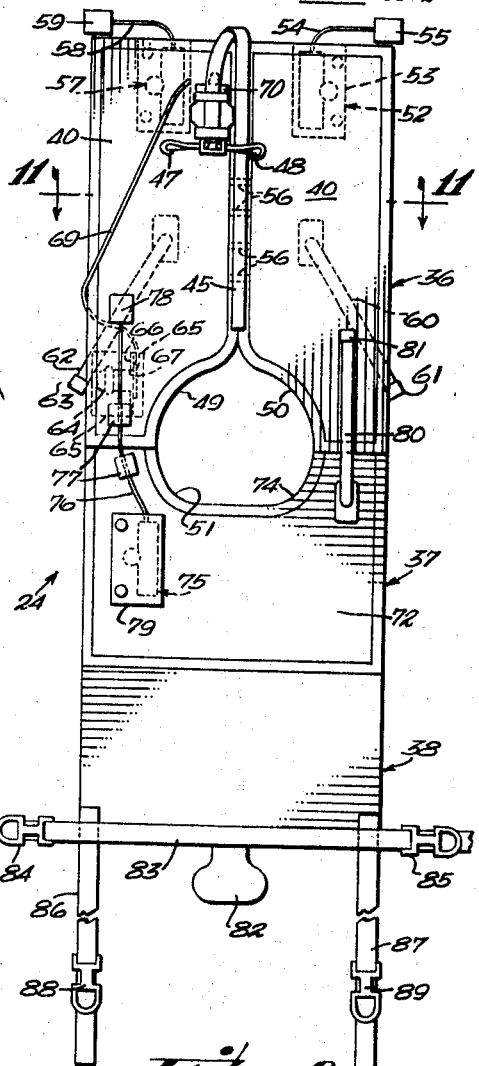
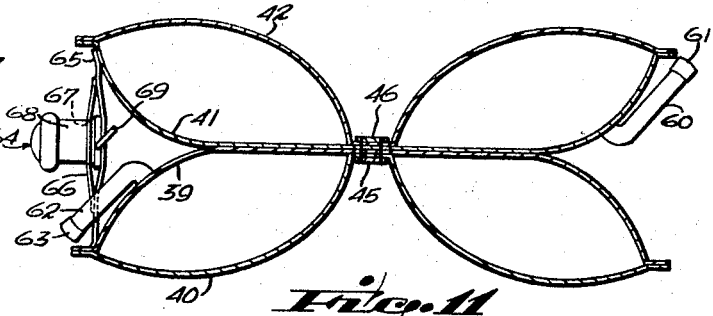
INVENTOR.
WILLIAM B. BENNETT
BY Ernest A. Schmidt
ATTORNEY.

United States Patent Office 3,437,374
Patented Apr. 8, 1969

3,437,374
COMBINATION HEADREST AND LIFEVEST CONTAINER
William B. Bennett, 1525 NE. 149th St., North Miami, Fla. 33161
Filed July 6, 1967, Ser. No. 651,452
Int. Cl. A47c 7/38, 7/62
U.S. Cl. 297—391         6 Claims

ABSTRACT OF THE DISCLOSURE

A combination headrest and lifevest container for incorporation in passenger chairs of the type used in commercial aircraft, including means for its removable attachment at the top of a passenger chair backrest, and having at the front a headrest cushion portion hingedly connected to a container portion and operative to swing outwardly and upwardly with respect thereto for release of an inflatable lifevest contained therein, the lifevest comprising manually operative release means combinatively associated with the cushion portion to effect easy opening of the container portion for release of the lifevest into the hands of the seat passenger in an emergency.

---

This invention relates to lifevests for emergency use, particularly for application in commercial passenger aircraft flying over water. It is presently common practice to equip commercial airliners with inflatable lifevests for use by passengers in the event that the aircraft is forced down or "ditched" in water. Such inflatable lifevests as have heretofore been devised and used, however, have been stowed under the seat. With the continuous increase in size of airliners and more compact seat arrangement and structure for greater passenger carrying capacity, the space remaining under the seats and the front to back spacing between the seats has become smaller and smaller. This fact, coupled with the practice of passengers placing briefcases, smaller articles of luggage and the like between seat rows close to their seats has made it increasingly difficult for them to reach under their seats to extricate their particular lifevest. When under the stress of an actual emergency the chaotic conditions arising because of passengers being unable to extricate their particular lifevest could prove disastrous.

It is, accordingly, the principal object of this invention to obviate the above-described deficiencies in lifevest structure and stowage, particularly on passenger aircraft flying over water. A more particular object is to provide, for use with a passenger seat chair, a combination headrest and lifevest container removably attachable to the top of the seat chair backrest and having a readily opened cover member and, further, a lifevest contained therein and having a pull-tab extending outwardly thereof within easy reach of the passenger occupying the seat.

Yet another object is to provide a combination headrest and lifevest container of the character described wherein the headrest is constructed as a unit with the container cover member and hingedly affixed to the remainder of the container for outward and upward opening with respect thereto to discharge the contained lifevest directly into the hands of the seat passenger.

Still another object is to provide, in a combination headrest and lifevest container, a lifevest receivable in the container and including release means operative, when actuated, to effect opening of the container and release of the lifevest.

Another object of the invention is to provide an improved lifevest for emergency use which, in addition to its release means cooperative with the container for its release in emergency, includes inflatable front and back sections for better upright positioning and improved buoyancy of the user in the water, and further including strap means for securing the lifevest in place either by securement above the waist or under the crotch of the user, selectively.

Yet another object is to provide an improved lifevest of the character described wherein that portion of the securement strap means not selected for use in securement to the body of the user can be utilized to attach or string together any number of persons similarly fitted with lifevests embodying the invention for greater safety and comfort in the water and to facilitate rescue.

Another object is to provide a combination headrest and lifevest container of the character described wherein the lifevest pull-tab will be of a distinctive color and conveniently located at the top of the chair backrest, not only for easy reach by the seat passenger for use in emergency, but to be readily observable for inspection purposes to insure that all lifevests are in place. The back of the pull-tab, moreover, can be used for posting inspection data stickers, whereat they can quickly and easily be seen for inspection and maintenance purposes.

Yet another object of the invention is to provide a combination headrest and lifevest container that can readily and inexpensively be applied to existing chair structures and which will be economical to manufacture, readily replaceable for safety inspection purposes, and efficient, durable and inconspicuous in use.

Other objects, features and advantages of the invention will be apparent from the following description when read with reference to the accompanying drawings. In the drawings, where like reference numerals denote corresponding parts throughout the several views;

FIG. 1 illustrates, in oblique view, a unitary three-seat chair structure of the type used in passenger transportation aircraft, modified to embody the invention;

FIG. 2 is a fragmentary oblique view, on an enlarged scale, of the top portion of an aircraft chair structure embodying the invention, as seen from the front, illustrating structural details of the combined headrest and lifevest container;

FIG. 3 illustrates, in oblique view, the combination headrest and lifevest container shown separately and as seen from the underside;

FIG. 4 is an oblique view of the top of the backrest portion of an aircraft chair embodying the invention, as seen with the combination headrest and lifevest container removed;

FIG. 5 is a vertical cross-sectional view, taken along the line 5—5 of FIG. 2 in the direction of the arrows;

FIG. 6 is a vertical cross-sectional view similar to that of FIG. 5, but illustrating a modified form of the invention;

FIG. 7 illustrates the lifevest embodying the invention fitted to a person and inflated, ready for use, as seen from the front;

FIG. 8 shows the lifevest of FIG. 7 as seen from the rear;

FIG. 9 illustrates the lifevest embodying the invention separately and extended to its full length, as seen from the outside;

FIG. 10 is a side elevational view of the lifevest shown in FIG. 9; and

FIG. 11 is a transverse cross-sectional view taken along the line 11—11 of FIG. 9 in the direction of the arrows.

Referring now in detail to the drawings, the numeral 10 in FIG. 1 designates, generally, a three-seat chair structure of the type used in commercial passenger airliners, each seat of which has a seat portion 11 and a back portion 12. The present invention relates to the improvement of such chair seats by the provision of a combined headrest and lifevest container, indicated generally at 13, including an improved lifevest structure, illustrated in FIGS. 7 through 11 and hereinafter described, of such size and configuration as to fit within the headrest. As illustrated in FIG. 5, the back portion 12 of a typical aircraft chair seat is of sheet metal construction, having a back panel 14, the upper end of which extends forwardly and concavely downwardly to provide an arcuate top concavity 15 against and along which the container portion of my improved combination headrest and lifevest container is removably attached, as is hereinbelow more particularly described. As further illustrated in FIG. 5, the top portion of the chair framework back portion 12 merges at its front end with a short, downwardly bent, front wall portion 16 substantially parallel with the back panel 14. The lower end of the downwardly bent front wall portion 16 extends into a short rearwardly bent portion 17, the inner end of which extends into a downwardly extending front wall panel 18, substantially parallel with respect to the rear wall panel 14 and defining, together with said rearwardly bent wall portion 17, a rectangular recess for the reception of an upholstered backrest 19, as illustrated in FIG. 5. As illustrated, the thickness of the backrest 19 is only slightly greater than the depth of the above-described recess within which it fits.

As illustrated in FIGS. 2, 3 and 5, the combined headrest and lifevest container 13 comprises an elongated container member 20 made of a lightweight sheet metal or a synthetic plastic, for example, and having an arcuate or semicylindrical body portion 21 closed at each end with substantially circular end plates 22 to define an interior recess 23 to receive the lifevest, indicated generally at 24 and hereinafter described with reference to FIGS. 7 through 11.

Means is provided for securing the combined headrest and lifevest container 13 against the upper end of the back portion 12 of the chair framework. To this end, as illustrated in FIGS. 3, 4 and 5, the body portion 21 of the container member 20 is fitted, along one marginal edge portion thereof, with a plurality of spring-loaded, outwardly extending, rotary fasteners 25 of the type having radially extending wing portions 26 adapted to fit into corresponding openings in a mating part. As illustrated in FIG. 4, the top concavity 15 of the back portion 12 of the seat framework is provided along its length with a like plurality of such openings 27 adapted to receive the rotary fasteners 25 when the combined headrest and lifevest container 13 is placed thereagainst as illustrated in FIGS. 2 and 5. To secure the combined headrest and lifevest container 13 in place, it is only necessary to turn the rotary fasteners 25 into locking engagement with respect to their associated openings 27, kerfs 28 being provided at the inner ends of the fasteners 25 to facilitate such turning into locking engagement with the use of a screwdriver when the container is opened, as hereinafter described. Hingedly secured along the opposite or upper edge of the body portion 21 of the container member 20, as by a piano hinge 29, is a substantially rectangular cover plate 30 having the same length as that of said container member but being of somewhat greater width so as to overlap the downwardly bent front wall portion 16 of the chair framework back portion 12 when the container member is affixed thereto, as best illustrated in FIG. 5. Secured against the outside of the coverplate 30 is an outwardly extending resilient headrest member or cushion 31, which is preferably substantially semicircular in cross-sectional shape and which extends from the piano hinge 29 at the upper end of said cover plate to the lower edge of said cover plate. The headrest member 31 can be made of any suitable upholstery material such as foam rubber 32 covered with any suitable outer fabric 33. As best illustrated in FIG. 5, the lower end of the upholstered headrest member 31 abuts the upper end of the upholstered backrest 19 in overlying relation with respect to the downwardly bent front wall portion 16 of the back portion 12 of the seat framework. As a means for releasably securing the headrest member 31 in position against the downwardly bent front wall portion 16, pressure-sensitive adhesive means is utilized, said adhesive means preferably comprising cooperating strips of woven nylon fabric having different physical characteristics and which adhere tenaciously to each other when pressed together. Such strips are sold under the trade name "Velcro" by American Thread Co., of New York, N.Y., and Chicago, Ill. One of the "Velcro" strips has a soft, wool-like surface termed the "fleecy" strip. The other strip has a comparatively roughened and harder surface comprising rows of loop hooks extending outwardly of the fabric body or base of the strip and termed the "burr" strip. In FIG. 4 it will be seen that two sections of "fleecy" strip 34 are secured, as by the use of a suitable adhesive, against opposite side portions of the downwardly bent front wall portion 16 of the back portion 12 of the seat framework. The sections of "fleecy" strip 34 cooperate with two sections of "burr" strip 35 secured against the outside of the lower end of the cover plate 30 at opposite side portions thereof and so positioned as to adhere to the "fleecy" strips 34 when the headrest member 31 is disposed in its normal covering position with respect to the container member 20. It will be understood that the above-described attachment device permits quick release to facilitate opening of the container member 20 for removal of the contained lifevest 24 in case of emergency, as is hereinafter more particularly described.

Referring now to FIGS. 7 through 11 of the drawings, the lifevest 24 comprises an inflatable chest portion 36, an inflatable upper back portion 37 and a lower back panel 38, all of which are fabricated, for the most part as hereinbelow described, of a strong, impervious fabric such as nylon cloth impregnated or coated with a thin layer of natural or synthetic rubber. The lifevest chest portion 36 comprises a pair of inner and outer, substantially rectangular, front panels 39, 40, respectively, peripherally sealed together, such as by heat-sealing, to provide inflatable interior chambers, as hereinafter described. The inflatable chest portion further comprises rectangular inner and outer rear panels 41, 42, respectively, of the same size as and arranged behind the inner and outer front panels 39 and 40, said rear panels also being sealed together about their periphery to provide inflatable interior chambers. As is best illustrated in FIGS. 9 and 11, the front panels 39, 40 and the rear panels 41, 42 are secured together along a central, longitudinally extending zone by means of opposed, outer and inner fabric straps 45, 46, sewn or otherwise secured together through said front and rear panels. As best illustrated in FIGS. 9 and 10, the straps 45, 46 begin somewhat short of the upper end of the front and rear panels 39, 40, and 41, 42, respectively, and extend somewhat beyond the lower end of said panels to terminate in attachment with a pair of sidewardly opposed clip hooks 47, 48 utilized to secure the lifevest to the body of the user, as is hereinafter described. As further illustrated in FIG. 9, the front panels 39, 40 and the rear panels 41, 42 are formed at each side of the upper ends of the straps 45, 46 with opposed, arcuate cutout portions or recesses 49, 50 extending into the top of said panels in spaced relation to each side thereof to define the front portion of a neck opening 51.

Means is provided for individually and automatically inflating the side-by-side chambers defined by the inner and outer front panels 39, 40 as partitioned by the longitudinal straps 45, 46. To this end, the inner panel 39, at one side and near the lower end thereof, has secured thereto a compressed gas inflating unit 52 removeably attached thereat and communicating with the interior chamber defined by said inner front panel and the outer front panel 40. As indicated at 53 in FIG. 9, the compressed gas unit 52 is preferably enveloped in a fabric protective covering 51. A cord 54 terminating in a conspicuous pull-tab 55 extends loosely from the bottom of the lifevest when worn, as illustrated in FIG. 7. It will be understood that pulling down sharply on the actuating tab 55 will pierce a cartridge or cylinder of an inert gas such as carbon dioxide to inflate the chambers defined by the inner and outer front panels 39, 40 of the lifevest 24. To permit the inflating gas to flow between both sides of the front panels 39, 40, a suitable number of transverse openings, indicated at 56 in FIG. 9, are provided between the front and rear straps 45, 46.

As a means for automatically inflating the interior chambers defined by the inner and outer rear panels 41, 42 at the front of the lifevest 24, a compressed gas inflating unit 57 is secured against the inner panel 41 of said rear panels in communication with the inside thereof and located near the lower end thereof at the side opposite that of the compressed gas unit 52. The compressed gas unit 57 is likewise provided with a cord 58, terminating in a pull-tab 59. Since the compressed gas units 52 and 57 are of known construction, and since no claim is made as to their construction, it is deemed unnecessary to describe them in greater detail herein. Appropriate transverse openings (not illustrated) communicating between each side of the interior of the rear panels 41, 42 through the constricting straps 45, 46 insures balanced inflation at each side of the enclosure defined by said rear panels.

Means is also provided for orally inflating the chambers defined by the front panels 39, 40 and the rear panels 41, 42. To this end, there is secured to the inner front panel 39, in spaced-relation above the compressed gas unit 57, a fairly stiff rubber tube 62 in communication with the interior of the inflation chambers defined by said inner panel and outer panel 40 and extending upwardly between said inner panel and the inner pannel 41 of the rear panels 41, 42 to terminate in a check-valve 63. As illustrated in FIG. 7, the upper end of the inflation tube 62 will be so located when the lifevest is worn as to permit easy reach by the mouth for inflation in case of failure of the above-described compressed gas automatic inflating mechanism. Similarly, the inner panel 41 of the rear panels 41, 42 is provided with an inflation tube 60 extending from a position somewhat spaced above the compressed gas inflating unit 52 and terminating in a check-valve 61 conveniently reachable for inflation by mouth at the front side of the lifevest 24 opposite the inflation tube 62.

As illustrated in FIG. 7, the lifevest 24 is provided at one side, at about shoulder height when worn, with a signal light 64. As means for holding the signal light 64 in place, a web of fabric 65 is sewn or otherwise secured between marginal side portions of the front inner and outer panels 39, 40 and the rear inner and outer panels 41, 42. Sewn or otherwise secured against the outside of the web member 65 is a rectangular patch of material 66, open at the bottom. A central opening 67 in the rectangular patch of material 66 permits the insertion therein of a light lamp unit 68, said lamp unit having an enlarged base retained in place between said patch of material 66 and the fabric web 65. As illustrated in FIGS. 7 and 9, an electrical energizing cord 69 extends from light lamp unit 68 to terminate at a battery pack and actuator switch unit 70 taped or otherwise secured against the lower outer ends of the straps 45, 46 at the approximate location of the clip hooks 47, 48. Since the emergency signal light system including the signal light 64 and the battery pack and actuating switch unit 70 are of known construction, and since no claim is made herein as to their construction, it is deemed unnecessary to further describe them herein, it being understood that the switch means provided will be of the type automatically effecting energization of the lamp when immersed in water, or, alternatively, capable of being manually operated.

Referring now to FIGS. 8, 10 and 11, it will be seen that the upper end of the above-described inflatable chest portion 36 of the lifevest 24 extends into the inflatable upper back portion 37 which is of the same width and somewhat greater than half of its length. The inflatable upper back portion comprises inner and outer substantially rectangular fabric panels 71, 72, respectively, peripherally sealed together to define an inflatable interior chamber 73. As best illustrated in FIG. 9, the upper or inner end of the upper back portion 37 is formed with a rounded recess 74, the ends of which merge with the upper ends of the arcuate recess 49, 50 of the inflatable chest portion 36, to define with the front portion of the neck opening 51 a rounded opening sufficiently large to pass over the head when donning the lifevest. As a means for automatically inflating the upper back portion 37, the outer panel 72 thereof has secured thereto, near the upper end and at that side of the vest supporting the signal light 64, a compressed gas inflation unit 75 in communication with the interior of said upper back portion. As illustrated in FIGS. 7, 8 and 9, the pull-cord 76 associated with the compressed gas unit 75 extends over the shoulder of the vest and through a pair of guide loops 77 secured against the outsides of the outer panels 72 and 40 to terminate in a pull-tab 78 conspicuously available for pulling upon in emergency at a position just below the shoulder at one side of the body when worn. It will be understood that the compressed gas inflation unit 75 will be the same as the above-described units 52 and 57, and may likewise be enclosed or enveloped in a fabric pocket 79 removably attachable against the outer panel 72 by any convenient means.

As best illustrated in FIG. 8, means is provided for orally inflating the upper back portion 37. To this end, there is secured to the outer rear panel 72 thereof at a position opposite the compressed gas unit 75, a rubber tube 80 in communication with the interior of the inflation chamber defined by said outer panel and inner panel 71, extending upwardly above the shoulder of the wearer and terminating in a check valve 81. The upper end of the inflation tube 80 will thus be so located when the lifevest is worn as to permit easy reach for oral inflation in case of failure of the above-described compressed gas automatic inflating mechanism.

The lower back panel 38 comprises a single sheet of fabric of the same width as that of the inflatable chest portion and upper back portions 36, 37, respectively, of the lifevest 24, and of about one-half the length of said inflatable chest portions. As illustrated in FIGS. 8 and 9, a pull-tab 82 is secured to the outer edge portion of the lower back panel 38 at a central position therealong and extending outwardly thereof for the purpose hereinafter appearing.

The lifevest 24 is provided with strap means for securement to the person of the wearer either at the waist or under the crotch. To this end, there is sewn or otherwise secured along the outer marginal end portion of the lower back panel 38, a strap 83 having strap end portions extending well beyond the sides of said back panel. The outwardly extending ends of the strap 83 are fitted with attachment loop members 84, 85 adjustably fixed along the respective ends of said straps and adapted for hooking connection with respective ones of the clip hooks 47, 48 at the terminal ends of the straps 45, 46, at the front of the lifevest structure. As illustrated in FIG. 8, the strap ends 83, 83 are not shown in use as the vest attachment means, the device being illustrated with the alternative use of crotch straps 86, 87, as the attachment means. As illustrated in FIGS. 7, 8 and 9, the crotch attachment means comprises a pair of straps 86, 87 secured to and extending downwardly or axially outwardly of the outer end of the lower back panel 38. The crotch straps 86, 87 similarly are equipped with adjustable attachment loop members 88, 89, respectively, for hooking engagement with the clip hooks 47, 48. It is to be understood that no matter whether the waist straps 83, 83 or the crotch straps 86, 87 are used as the securing means, the other two straps will be left free for use in tying to the free straps of another person floating in the water and fitted with a similar lifevest under emergency rescue conditions, for mutual help and comfort and to facilitate discovery and rescue. It is further to be noted that my improved inflatable lifevest structure, by virtue of its inclusion of the inflatable upper back portion 37, tends to buoy the wearer at the back as well as at the front not only to hold the person higher out of the water, but also to hold him in a more nearly vertical position in the water for greater comfort, and to facilitate his scanning his surroundings as an aid to his rescue and the rescue of his fellow passengers.

Referring to FIGS. 1, 2 and 5, it will be seen that the inflatable lifevest 24 is compactly rolled to fit within the combined head rest and lifevest container 13, with the lower back panel 38 at the outside and with the pull-tab 82 thereof projecting downwardly and outwardly over a central portion at the top of the chair back rest 19 whereat it is readily accessible to the seat passenger in case of an emergency over water. It will be understood that when the lifevest tab 82 is pulled outwardly of the chair back rest, it will effect release of the headrest member 31 secured in its position by means of the pressure-sensitive adhesive means described above, permitting it to swing upwardly to the position thereof illustrated in broken lines in FIG. 2 and thereby permitting the contained lifevest to fall into the hands of the seat passenger.

FIG. 6 illustrates a modification of the invention wherein the headrest of the combined headrest and lifevest container remains fixed with respect to the chair and the body portion 21a is swingable upwardly from the rear of the seat to effect discharge of the contained lifevest 24 in front of the passenger seated to the rear. To this end, the headrest cover plate has fixed against the rear thereof, near the lower end, a longitudinally extending bracket or flange 21b having openings along its length equipped with rotary fasteners 25 for securement to the top concavity of the back portion 12 of the chair seat. The semicylindrical body portion 21a will normally be held in place in enclosing position with respect to the back panel of the chair by a short strap 90 fixed at one end to the outside of said body portion, as indicated at 91, and releaseably secured to said back panel as by a snap fastener 92. As in the embodiment of the invention illustrated in FIGS. 1 through 5, the lifevest tab 82 will project outwardly of the cover provided by the body portion 21a when closed within sight and easy reach of the passenger seated to the rear of the seat equipped with the combination headrest and lifevest container embodying the invention. It will be understood that release of the lifevest can readily be effected by pulling outwardly on the vest tab 82, and additionally pulling upon the snap strap 90, if necessary.

While I have illustrated and described herein only two forms in which my invention can conveniently be embodied in practice, it is to be understood that these forms are presented by way of example only and not in a limiting sense. Thus, while I have illustrated and described the invention particularly with reference to use in aircraft, it will be understood that it could as well be applied to passenger seats used in ocean liners, ferries and the like. The invention, in brief, comprises all the embodiments and modifications coming within the scope and spirit of the following claims.

What I claim as new and desire to secure by Letters Patent is:

1. In a combination headrest and lifevest container for use in association with a passenger chair of the type having a chair seat and a chair back rest, the combination comprising, an elongated, rigid container member defining a chamber for containing an inflatable lifevest, means for releasably attaching said container member across the top of the seat backrest, a cover member swingably attached along one edge of the length of said container member and normally in covering position with respect to said chamber but operative to be swung upward with respect thereto for uncovering said chamber, means for releasably securing said cover member in said covering position, and a headrest cushion member secured along the outside of said cover member.

2. A combination headrest and lifevest container as defined in claim 1 wherein said means for releasably securing said cover member in said covering position is pressure-sensitive.

3. A combination headrest and lifevest container as defined in claim 2 wherein said means for releasably securing said cover member in said covering position comprises an inflatable lifevest contained in said chamber and having a pull-tab projecting outwardly of said chamber between said cover member and said container member.

4. A combination headrest and lifevest container as defined in claim 1 wherein said headrest cushion member extends downwardly beyond said container member to overlap an upper marginal end portion at the front of a seat backrest of the chair to which said container member is attached.

5. A combination headrest and lifevest container as defined in claim 1 wherein said elongated container member is substantially semicylindrical in cross-sectional shape.

6. A combination headrest and lifevest container as defined in claim 5 wherein said means for releasably attaching said container member to the top of said seat backrest comprises a plurality of rotary fasteners arranged in spaced relation along a marginal area at the other edge thereof.

References Cited

UNITED STATES PATENTS

| | | | |
|---|---|---|---|
| 2,404,109 | 7/1946 | Steele | 297—391 X |
| 2,566,757 | 8/1951 | Alexander | 297—401 |
| 3,228,045 | 1/1966 | Shepherd et al. | 9—314 |
| 3,337,264 | 8/1967 | Collins et al. | 297—217 X |

FOREIGN PATENTS 1,084,948  9/1965  Great Britain.

CASMIR A. NUNBERG, *Primary Examiner.*

U.S. Cl. X.R.

297—217